(12) United States Patent
Okuyama

(10) Patent No.: US 6,257,726 B1
(45) Date of Patent: Jul. 10, 2001

(54) ILLUMINATING APPARATUS AND PROJECTING APPARATUS

(75) Inventor: Atsushi Okuyama, Tokorozawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/022,274

(22) Filed: Feb. 11, 1998

(30) Foreign Application Priority Data

Feb. 13, 1997 (JP) .................................................... 9-044662

(51) Int. Cl.$^7$ ...................................................... S03B 21/14
(52) U.S. Cl. .................................................. 353/20; 353/38
(58) Field of Search ............................... 353/20, 38, 102, 353/31, 33, 34, 37; 349/5, 8, 9

(56) References Cited

U.S. PATENT DOCUMENTS

| | | | |
|---|---|---|---|
| 4,770,525 | * | 9/1988 | Umeda et al. ................. 353/102 |
| 5,098,184 | * | 3/1992 | Van Den Brandt et al. ......... 353/102 |
| 5,381,278 | * | 1/1995 | Shingaki et al. ............... 353/20 |
| 5,387,953 | * | 2/1995 | Minoura et al. ................ 353/20 |
| 5,446,510 | * | 8/1995 | Mitsutake et al. .............. 353/20 |
| 5,566,367 |   | 10/1996 | Mitsutake et al. ............. 359/497 |
| 5,590,942 | * | 1/1997 | Kimura et al. ................. 353/20 |
| 5,626,409 | * | 5/1997 | Nakayama et al. ............... 353/31 |
| 5,704,701 | * | 1/1998 | Kavanagh et al. ............... 353/31 |
| 5,751,480 |   | 5/1998 | Kitagishi ..................... 359/485 |
| 5,764,412 | * | 6/1998 | Suzuki et al. ................. 353/20 |
| 5,772,299 | * | 6/1998 | Koo et al. .................... 353/20 |
| 5,826,959 | * | 10/1998 | Atsuchi ....................... 353/20 |

FOREIGN PATENT DOCUMENTS

| | | |
|---|---|---|
| 61-90584 | 5/1986 | (JP) . |
| 4-310903 | 11/1992 | (JP) . |
| 4-340919 | 11/1992 | (JP) . |
| 5-107505 | 4/1993 | (JP) . |
| 7-181392 | 7/1995 | (JP) . |
| 8-304739 | 11/1996 | (JP) . |

* cited by examiner

*Primary Examiner*—William Dowling
(74) *Attorney, Agent, or Firm*—Fitzpatrick, Cella, Harper & Scinto

(57) ABSTRACT

An illuminating apparatus includes a condensing optical system for converting light from a light source into convergent light, and a first convex lens array for receiving the convergent light, and a collimating optical system for making a plurality of light beams from the first convex lens array parallel to one another. In addition, a polarization converting element array individually converts the plurality of light beams from the collimating optical system into polarized lights.

73 Claims, 18 Drawing Sheets

5  7  6 8

5  7  La4

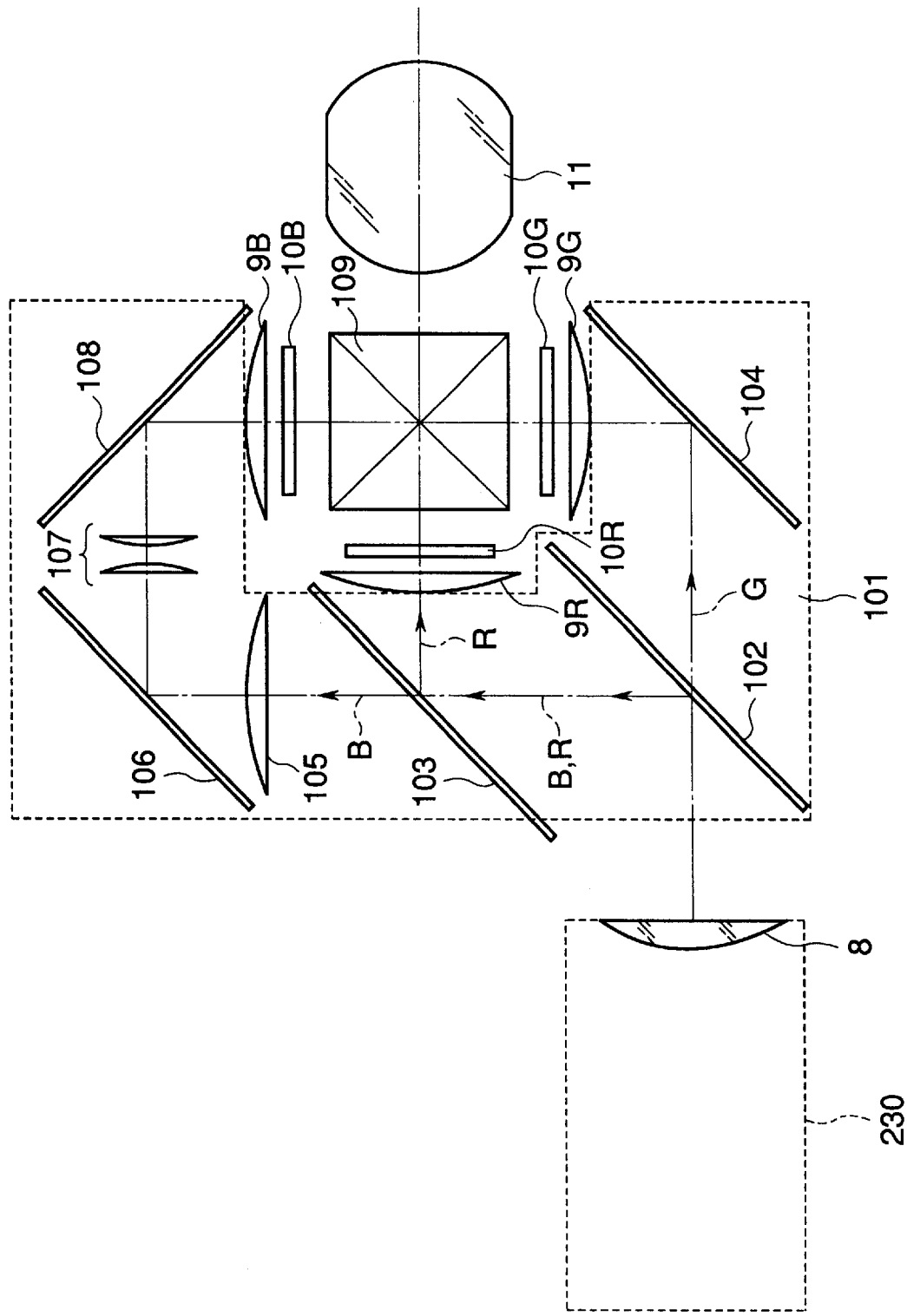

ILLUMINATING APPARATUS AND PROJECTING APPARATUS

BACKGROUND OF THE INVENTION

1. Field of the Invention

This invention relates to an illuminating apparatus and a projecting apparatus, and particularly is preferable for a liquid crystal projector for projecting the enlarged image of a liquid crystal display element (liquid crystal panel) onto a screen or a wall by a projection lens.

2. Related Background Art

There have heretofore been proposed various liquid crystal projectors for illuminating a liquid crystal panel by a light beam from a light source, and enlarging and projecting an image based on transmitted light or reflected light from a liquid crystal panel onto a screen or a wall by a projection lens.

A liquid crystal panel of the TN type which can relatively easily obtain an image of high contrast utilizes the polarizing characteristic of liquid crystal. Therefore, usually a polarizer and an analyzer are provided before and behind the liquid crystal panel. Such polarizing filters have a characteristic of transmitting therethrough polarized light of light incident thereon in a particular direction of polarization and intercepting polarized light in a direction of polarization orthogonal to said direction of polarization. Thus, at least a half of light from the light source of the liquid crystal projector is intercepted by the polarizer, and the brightness of an projected image has been not sufficient.

FIG. 1 of the accompanying drawings is a schematic view of the essential portions of a projector proposed in Japanese Laid-Open Patent Application No. 61-90584 which has solved this problem of brightness.

In the liquid crystal projector of FIG. 1, a light beam from a light source 201 is made to enter a polarized light separating element 202 for separating random polarized light into two polarized components (P-polarized light and S-polarized light) orthogonal to each other through an infrared cut filter 208 and a lens 207. A half wavelength plate 203 is provided in the optical path of the S-polarized light which is reflected light of a light be passed through the polarized light separating element 202. The direction of polarization of the polarized light transmitted through the half wavelength plate is rotated by 90° by the half wavelength plate and this light is caused to emerge in the same way as the P-polarized light which is the transmitted light. The optical paths of two polarized lights from the polarized light separating element 202 are bent and superposed one upon the other on a liquid crystal panel 205 by the use of a mirror 209 and a prism 204 so that all of the light from the light source 201 can be utilized.

In the liquid crystal projector shown in FIG. 1, the polarized light separating element 202 requires the same degree of size as that of the lens 207 or a reflector 206, and this leads to the disadvantage that the projector becomes bulky and expensive and further, since the light beam is separated into two beams, the illuminating light beam becomes about twice as large as that in the prior art, and to enable all of the illuminating light beam to be transmitted through a projection lens, the opening diameter ($F_{NO}$) of the projection lens becomes two or more times that in the prior art, and this also has led to a disadvantage in designing.

In contrast, in an illuminating apparatus for the liquid crystal projector of Japanese Laid-Open Patent Application No. 8-304739, a polarization separating element, a beading mirror and a half wavelength plate are each made into an array to thereby achieve the thinning of a polarization converting portion and moreover, the size of the illuminating light beam is maintained at the same degree as that in the prior art so that a conventional projection lens can be used.

SUMMARY OF THE INVENTION

It is the object of the present invention to provide an illuminating apparatus of which the polarization converting portion can be made smaller than in the prior art and a projecting apparatus such as a liquid crystal projector of which the polarization converting portion can be made smaller than in the prior art.

A first aspect of the present invention is characterized by a condensing optical system for converting light from a light source into convergent light, a first convex lens array for receiving the convergent light, a collimating optical system for making a plurality of light beams from the first convex lens array parallel to one another, and a polarization converting element array for individually converting the plurality of light beams from the collimating optical system into polarized lights.

A second aspect of the present invention is characterized by a condensing optical system for converting Light from a light source into convergent light, a collimating optical system for converting the convergent light into parallel light, a first convex lens array for receiving said parallel light, and a polarization converting element array for individually converting a plurality of light beams from the first convex lens array into polarized lights.

What is herein referred to as a convex lens refers to a lens having positive refractive power. Accordingly, in the present invention, use can also be made of a Fresnel lens having positive refractive power or a refractive index division type lens having positive refractive power which does not have a so-called convex surface. Also, what is herein referred to as a concave lens refers to a lens having negative refractive power. Accordingly, in the present invention, use can also be made of a Fresnel lens having negative refractive power or a refractive index distribution type lens having negative refractive power which does not have a so-called concave surface.

BRIEF DESCRIPTION OF THE DRAWINGS

FIG. 23 is a schematic view of a three-plate type color liquid crystal projector to which the illuminating apparatus 230 of the present invention is applied.

DESCRIPTION OF THE PREFERRED EMBODIMENTS

Figure 1:
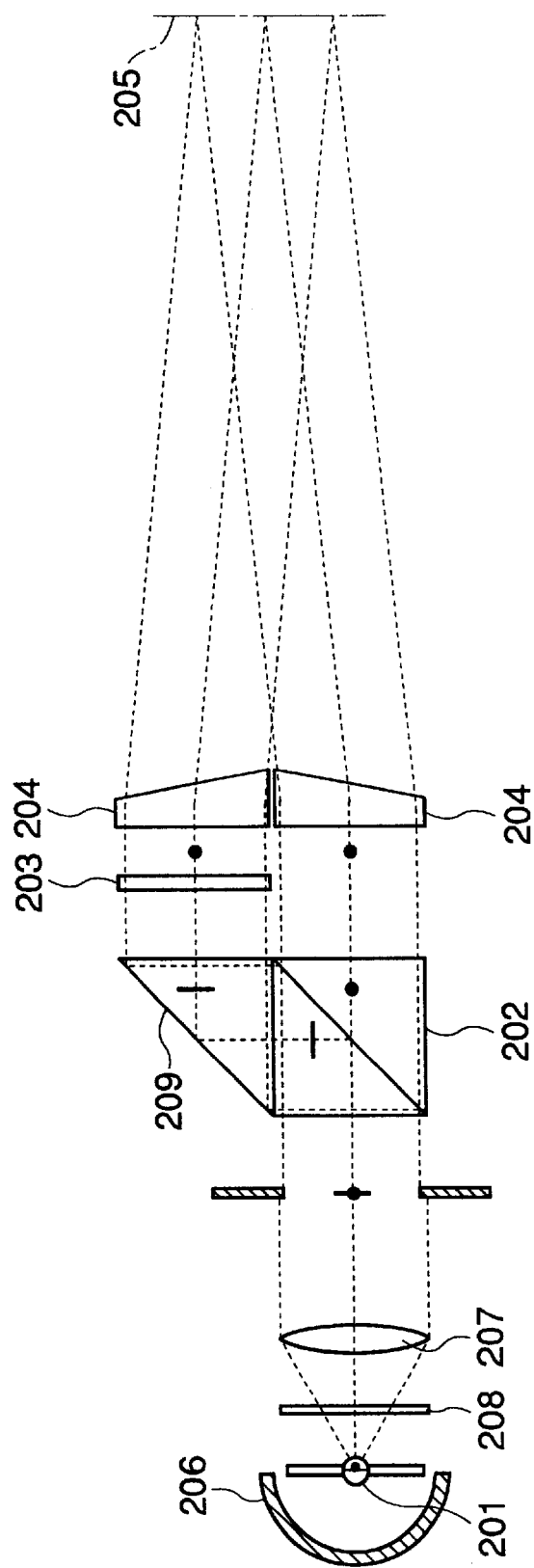
FIG. 1 shows an illuminating apparatus according to the prior art.
Figure 2:
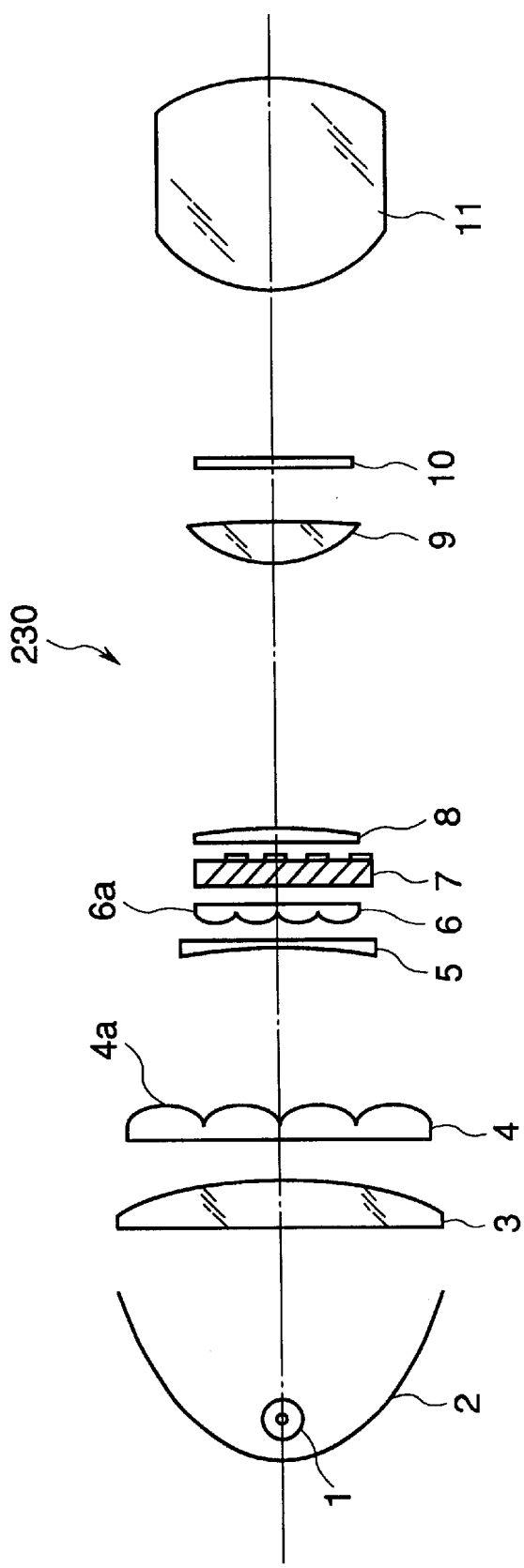
FIG. 2 is a schematic view of the essential portions of Embodiment 1 of the present invention.

FIG. 2 is a schematic view of the essential portions of an embodiment of the present invention. In FIG. 2, the reference numeral 230 designates a part or the whole of an illuminating apparatus, and the reference numeral 1 denotes a light source such as a metal halide lamp. The reference numeral 2 designates a parabolic mirror which is a reflector of which the reflecting surface comprises a parabolic surface, and this parabolic mirror reflects a light beam from the light source 1 and converts it into parallel light, and causes this parallel light to enter a lens 3. The lens 3 has positive refractive power.

Figure 3:
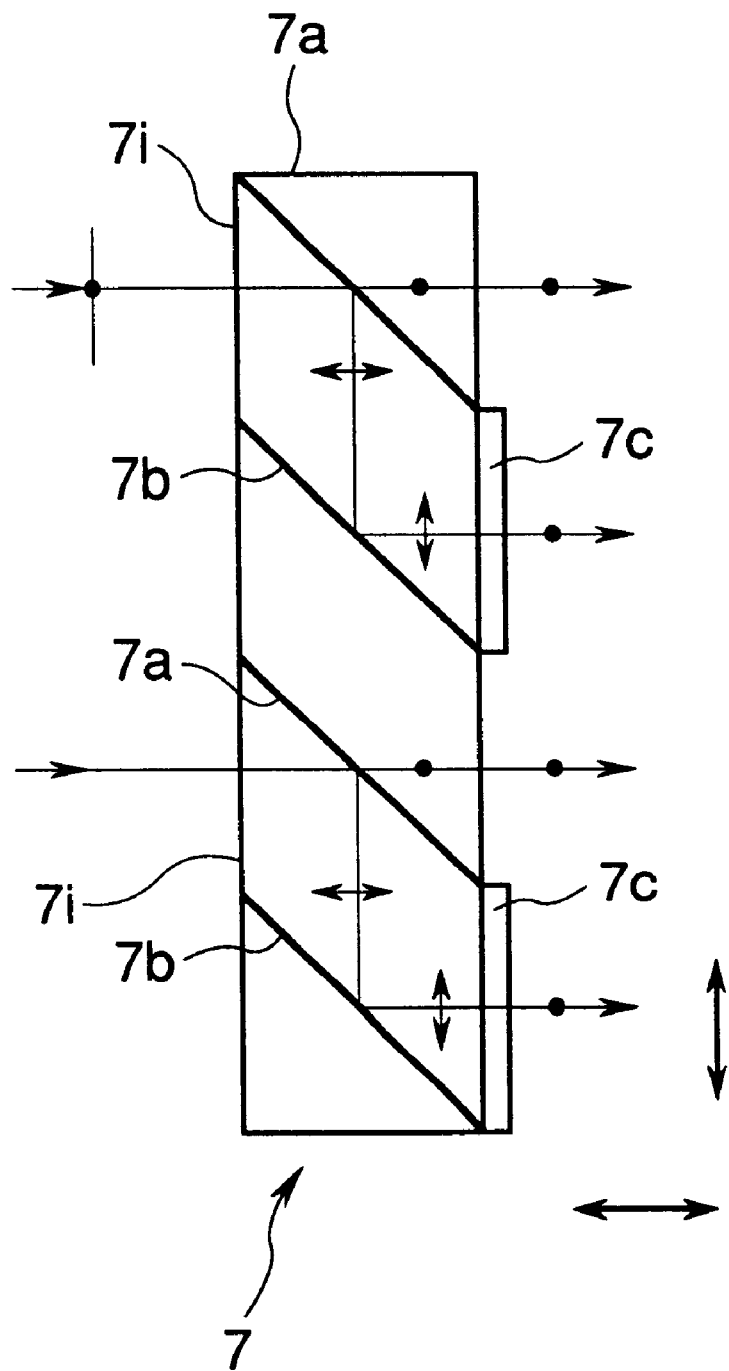
FIG. 3 is an illustration of a portion of FIG. 2.

The reference numeral 4 denotes a first convex lens array comprising a plate having a plurality of lenses 4a having positive refractive power. The reference numeral 5 designates a concave lens having negative refractive power. The reference numeral 6 denotes a second convex lens array comprising a plate having lenses 6a having positive refractive power which correspond to the individual lenses 4a of the first convex lens array 4. The reference numeral 7 designates a polarization converting element array having a construction shown in FIG. 3, and causing incident non-polarized (random-polarized) light to emerge as linearly polarized light polarized in a particular direction. The directions of polarization of polarized lights emerging from the respective polarization converting elements are coincident with each other as shown in FIG. 3.

The reference numeral 8 denotes a condensing lens having positive refractive power. The reference numeral 9 designates a condenser lens which condenses the illuminating light on a projection lens 11 through a panel 10. The reference numeral 10 denotes an image display element comprising a liquid crystal panel. The projection lens 11 has positive refractive power, and enlarges and projects an image formed by the image display element 10 onto a screen or a wall.

The concave lens 5 makes a plurality of nonparallel light beams from the first convex lens array parallel to one another and parallel also to the optical axis so that corresponding light beams in the polarization converting elements 7 may impinge on only the light receiving portions of the elements 7.

In the present embodiment, it is desirable that the light source 1 be a point source of light, but the light source 1 may have an expanse. When the light source 1 has an expanse, an expanse also occurs to each light beam from the first convex lens array 4 and therefore, provision is made of a second convex lens array comprising convex lenses (field lenses) corresponding to the lenses of the first convex lens array 4 which are disposed near the condensed positions of the light beams by the first convex lens array.

In the present embodiment, the first convex lens array 4 is provided in the optical path of convergent light, whereby the size of a secondary light source produced thereby is made small and therefore, the size of the polarization converting element array 7 can also be made small in conformity with the size of the recordary light source and thus, the outer diameters of the concave lens 5, the second convex lens array 6 and the polarization converting element array 7 are made smaller than the outer diameter of a condensing mirror, whereby the downsizing of the entire apparatus is achieved.

The construction of the polarization converting element array 7 will now be described with reference to FIG. 3. The polarization converting element array 7 comprises polarization converting elements arranged correspondingly to the individual lenses 6a of the second convex lens array 6, and each element has a polarization separating surface 7a, a reflecting surface 7b for bending the optical path of S-polarized light reflected by the polarization separating surface 7a by 90°, a half wavelength plate ($\lambda/2$ plate) 7c provided in the optical path of P-polarized light transmitted through the polarization separating surface 7a or the optical path of S-polarized light reflected by the polarization separating surface 7a. In FIG. 3, the $\lambda/2$ plates 7c are provided in the optical path of S-polarized light reflected by the polarized light separating surface 7a.

Figure 4:
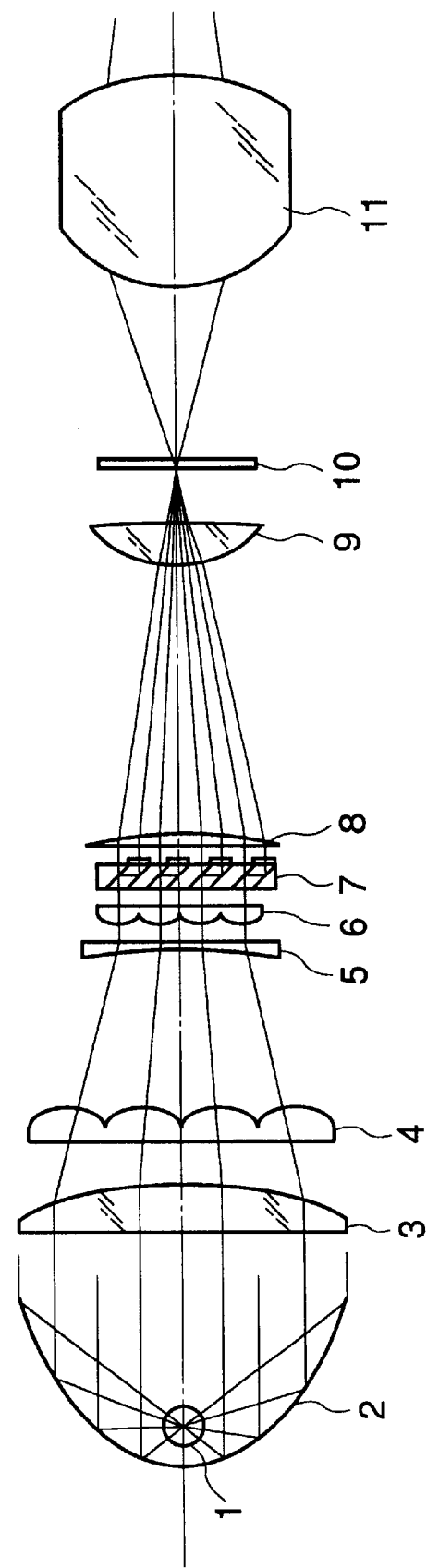
FIG. 4 is an illustration of the optical path of Embodiment 1 of the present invention.

The optical path of the light from the light source 1 In the present embodiment will now be described with reference to FIGS. 3 and 4. In FIGS. 3 and 4, the light emitted from the light source 1 is reflected toward the image display element 10 by the parabolic mirror 2, becomes parallel light, enters the first convex lens array 4 through the convex lens 3 and is divided into a plurality of light beams, which form a plurality of condensing points within a range smaller than the outer diameter of the parabolic mirror 2. The concave lens 5 makes the plurality of light beams from the first convex lens array 4 parallel to one another, and uniformizes the directions of the light beams entering the polarization converting element array 7, and thereafter directs them to the second convex lens array 6. The light beams transmitted through the second convex lens array 6 enter the corresponding polarization converting elements of the polarization converting element array 7.

The light beams which have entered the polarization converting elements are separated into S-polarized light and P-polarized light (↔ and •) of which the directions of polarization are orthogonal to each other by the polarization separating surface 7a, and the S-polarized light (↔) reflected by the polarization separating surface 7a is reflected by the reflecting surface 7b and is transmitted through the half wavelength plate 7c, by which it is converted into the light (•) of the same direction of polarization as the P-polarized light transmitted through the polarization separating surface 7a. Accordingly a plurality of light beams of the same direction of polarization emerges from the polarization converting element array 7. The plurality of light beams from the polarized light converting element array 7 are combined together on the image display element 10 by the condensing lens 8 and the condenser lens 9.

The light beam transmitted through the image display element 10 is directed to the projection lens 11, by which the image formed by the image display element 10 is formed on a screen or a wall.

Figure 5:
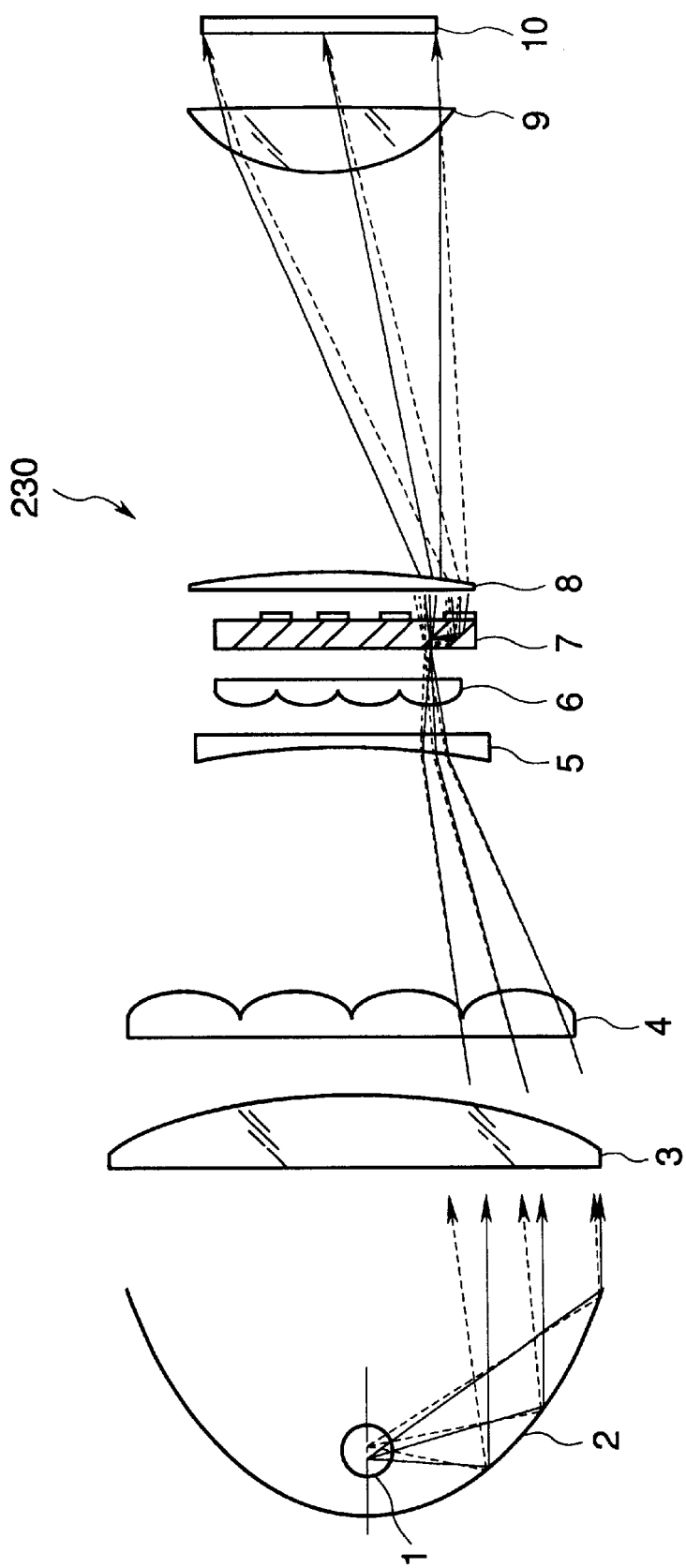
FIG. 5 is an enlarged illustration of a portion of FIG. 4.
Figure 6:
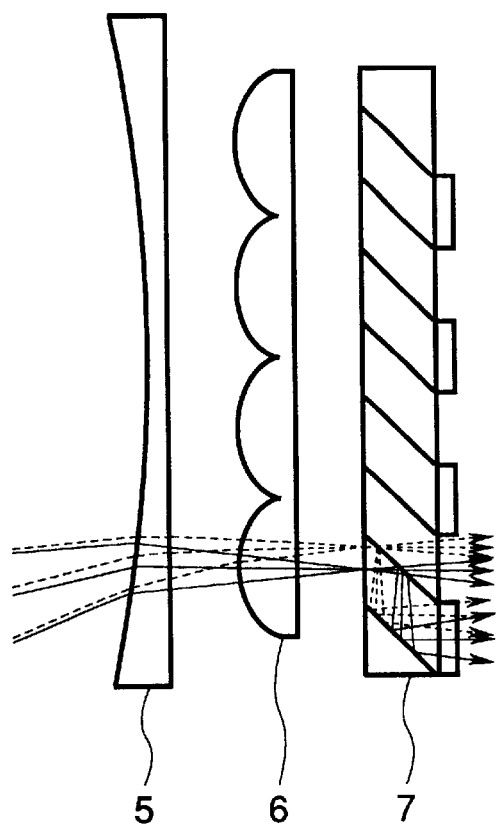
FIG. 6 is an enlarged illustration of a portion of FIG. 5.

FIGS. 5 and 6 are enlarged illustrations of a portion of FIG. 4. FIGS. 5 and 6 show the optical path in an ordinary case where the light beam from the light source 1 has an expanse. When the light beam from the light source 1 has an expanse, the angle of the light emerging from the parabolic mirror 2 becomes non-uniform, and each light beam condensed by the first convex lens array 4 also creates an expanse and the imaging point also expands.

So, in the present embodiment, the directions of a plurality of light beams of different directions of travel included in the light beams from the respective lenses of the first convex lens array 4 are uniformized by the action of the lenses 601 of the second convex lens array 6 provided near the condensed point of the plurality of light beams from the first convex lens array 4 to thereby suppress the expanse of these light beams.

Figure 7:
FIG. 7 is an illustration of another embodiment of a portion of FIG. 2.
Figure 8:
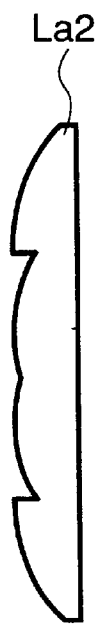
FIG. 8 is an illustration of another embodiment of a portion of FIG. 2.

In the present embodiment, the convex lens 3 and the first convex lens array 4 may be a lens La1 in which as shown in FIG. 7, they are made integral with each other, or only a lens La2 in which as shown In FIG. 8, the lenses of the first convex lens array 4 are made eccentric in the central direction.

Figure 9:
FIG. 9 is an illustration of another embodiment of a portion of FIG. 2.
Figure 10:
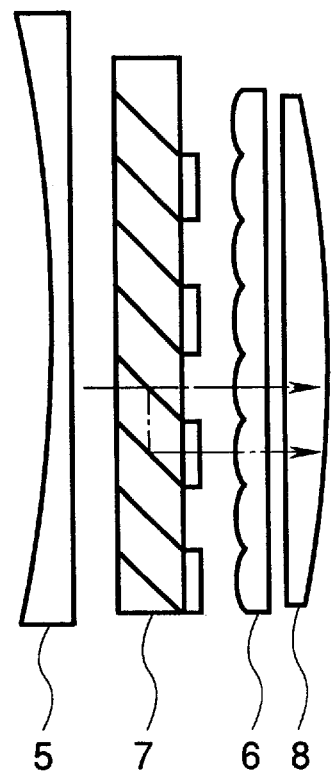
FIG. 10 is an illustration of another embodiment of a portion of FIG. 2.
Figure 11:
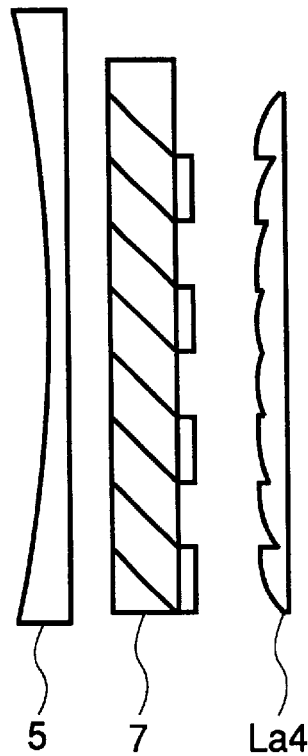
FIG. 11 is an illustration of another embodiment of a portion of FIG. 2.

Also, the concave lens 5 and the second convex lens array 6 may be only a lens La3 in which as shown in FIG. 9, the lenses of the second convex lens array 6 are made eccentric in the peripheral direction. Also, the second convex lens array 6 may be provided between the polarization converting element array 7 and the condensing lens 8 as shown in FIG. 10, or may be only a lens La4 in which as shown in FIG. 11, the lenses of the second convex lens array 6 are made eccentric in the central direction.

The present embodiment can be intactly used in a three-plate type liquid crystal projector using three image display elements 10 for RGB by providing a color resolving system 101 comprising a plurality of dichroic mirrors between the condensing lens 8 and the image display element 10, and providing a color combining system 109 comprising dichroic prisms or the like between the image display element 10 and the projection lens 11, as shown in FIG. 23.

Figure 12:
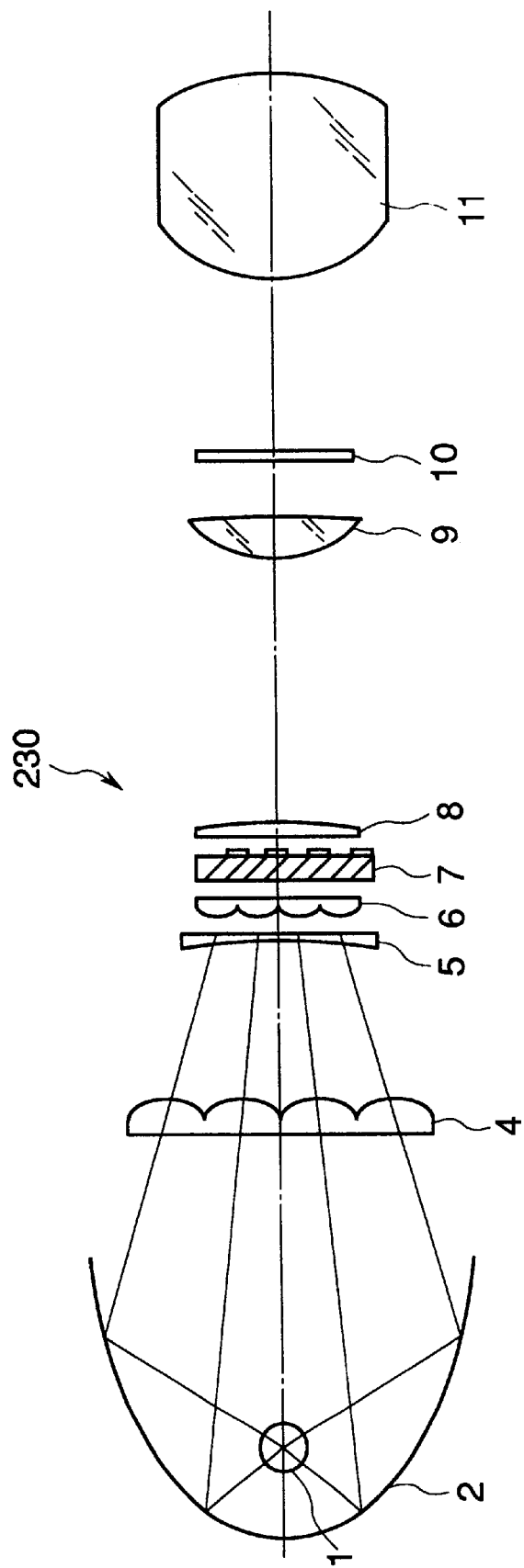
FIG. 12 is an schematic view of the essential portions of Embodiment 2 of the present invention.

FIG. 12 is a schematic view of the essential portions of Embodiment 2 of the present invention. In FIG. 12, the reference numeral 230 designates a part or the entire illuminating apparatus, and the same elements as the elements shown in FIG. 2 are given the same referee numerals. This embodiment differs from Embodiment 1 of FIG. 2 only in that the lens 3 is omitted, and by an elliptical mirror which is a reflector 2 of which the reflecting surface comprises an elliptical surface, instead of the parabolic mirror 2, the light beam from the light source 1 placed at the focus position thereof is converted into a convergent light beam and this convergent light beam is made to enter the first convex lens array 4, and in the other points, the construction of this embodiment is the same as that of Embodiment 1.

Figure 13:
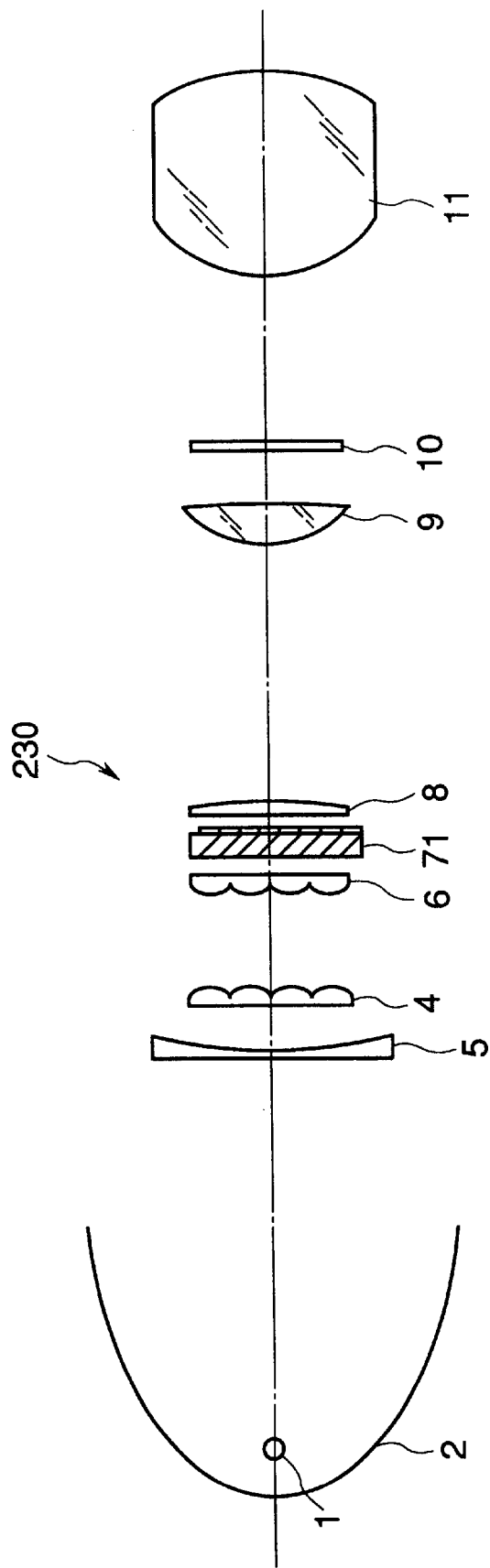
FIG. 13 is a schematic view of the essential portions of Embodiment 3 of the present invention.

FIG. 13 is a schematic view of the essential portions of Embodiment 3 of the present invention. In FIG. 13, the reference numeral 1 denotes a light source such as a metal halide lamp. The reference numeral 2 designates an elliptical mirror which is a reflector of which the reflecting surface comprises an elliptical surface. The light beam from the light source 1 placed at the focus position of the mirror 2 is reflected and condensed and converted into a convergent light beam by the mirror 2, and the convergent light beam is made to enter the concave lens 5. The concave lens 5 has negative refractive power.

The reference numeral 4 denotes a first convex lens array comprising a plate comprising a plurality of convex lenses 4a arranged side by side and having positive refractive power. The reference numeral 6 designates a second positive lens array comprising a plate comprising convex lenses 6a arranged side by side and having positive refractive power which correspond to the individual lenses 4a. The reference numeral 71 denotes a polarization converting element array comprising a construction shown in FIG. 15, and it converts incident non-polarized (random polarized) light into linearly polarized light polarized in a particular direction and causes this linearly polarized light to emerge. The reference numeral 8 designates a condensing lens having positive refractive power. The reference numeral 9 denotes a condenser lens which condenses the illuminating light on the entrance pupil (aperture stop) of a projection lens 11 through a liquid crystal panel 10. The reference numeral 10 designates an image display element comprising a liquid crystal panel. The projection lens 11 has positive refractive power, and enlarges and projects a projected image formed by the image display element 10 onto a screen or a wall.

Figure 15:
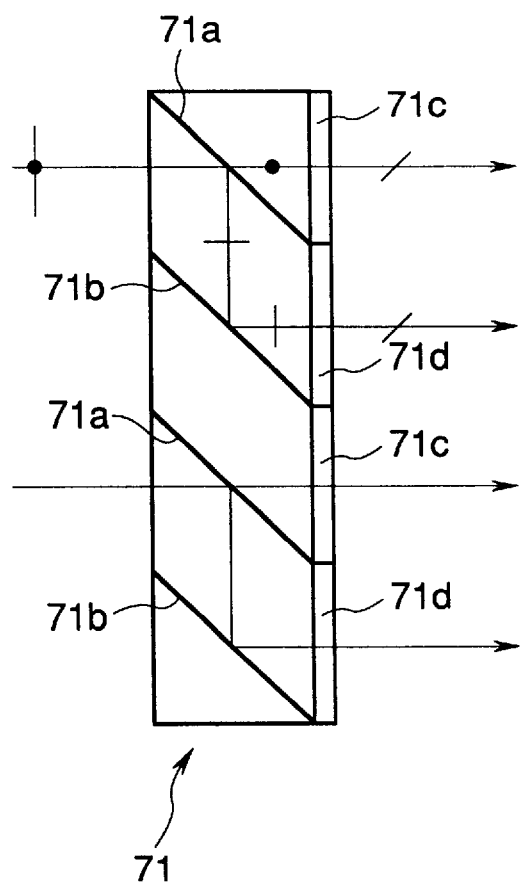
FIG. 15 is an illustration of a portion of FIG. is 14.

The construction of the polarization converting element array 71 will now be described with reference to FIG. 15. The polarization converting elements of the polarization converting element array 71 are provided correspondingly to the individual lenses 6a of the second convex lens array 6, and each of these elements has a polarization separating surface 71a, a reflecting surface 71b for bending the optical path of S-polarized light reflected by the polarization separating surface 71a, a first half wavelength plate 71c provided in the optical path of P-polarized light transmitted through the polarization separating surface 71a, and a second half wavelength plate ($\lambda/2$ plate) 71d provided in the optical path of the S-polarized light. Thereby the emergent light beam emerges with its polarized state uniformized.

Figure 16:
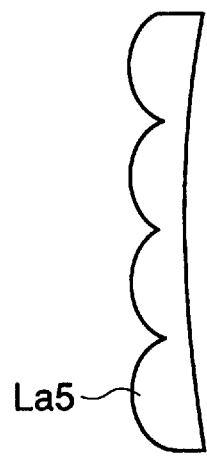
FIG. 16 is an illustration of another embodiment of a portion of FIG. 14.
Figure 17:
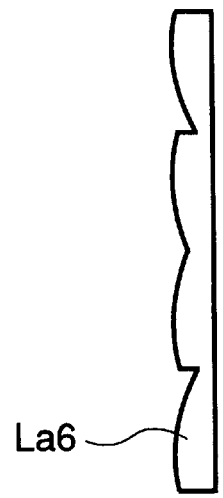
FIG. 17 is an illustration of another embodiment of a portion of FIG. 14.

The optical paths in the present embodiment will now be described with reference to FIG. 16 and 17. In FIGS. 16 and 17, the light emitted from the light source 1 is reflected in a particular direction (a direction toward the image display element 10) and converted into convergent light by the elliptical mirror 2, and enters the concave lens 5. The concave lens 5 converts the convergent light into parallel light. The parallel light from the concave lens 5 enters the first convex lens array 4 and is divided into a plurality of light beams by this array 4, and the plurality of light beams enter the second convex lens array 6 while forming a plurality of condensing points within a range smaller than the outer diameter of the elliptical mirror 2 near the second convex lens array 6. The plurality of light beams transmitted through the second convex lens array 6 enter the polarization converting element array 71.

The light beam which have entered the polarization converting elements of the polarization converting element array 71 are separated into S-polarized light ad P-polarized light (↔ and •) of which the directions of polarization are orthogonal to each other by the polarization separating surface 71a, and the S-polarized light (↔) reflected by the polarization separating surface 71a is reflected by the reflecting surface 71b and is transmitted through the second half wavelength plate 71d, whereby it is converted into linearly polarized light (/) polarized in an oblique direction and emerges. The P-polarized light (•) transmitted through the polarization separating surface 71a is transmitted through the first half wavelength plate 71c, whereby it becomes linearly polarized light (/) polarized in an oblique direction (the same direction as the S-polarized light) and emerges.

Thereby, a plurality of light beams of which the directions of polarization are the same emerge from the polarization converting element array 71. The plurality of light beams from the polarization converting element array 71 are combined together on the image display element 10 by the condensing lens 8 and the condenser lens 9.

The light beam transmitted through the image display element 10 is directed to the projection lens 11. An image formed by the image display element 10 is projected onto a screen or a wall by the projection lens 11.

In the present embodiment, the concave lens 5 and the first convex lens array 4 may be comprised of a lens La5 in which they are made integral with each other as shown in FIG. 16. Also, they may be comprised of a lens La8 in which as shown in FIG. 17, the lenses of the first convex lens array are made eccentric in the central direction.

Figure 18:
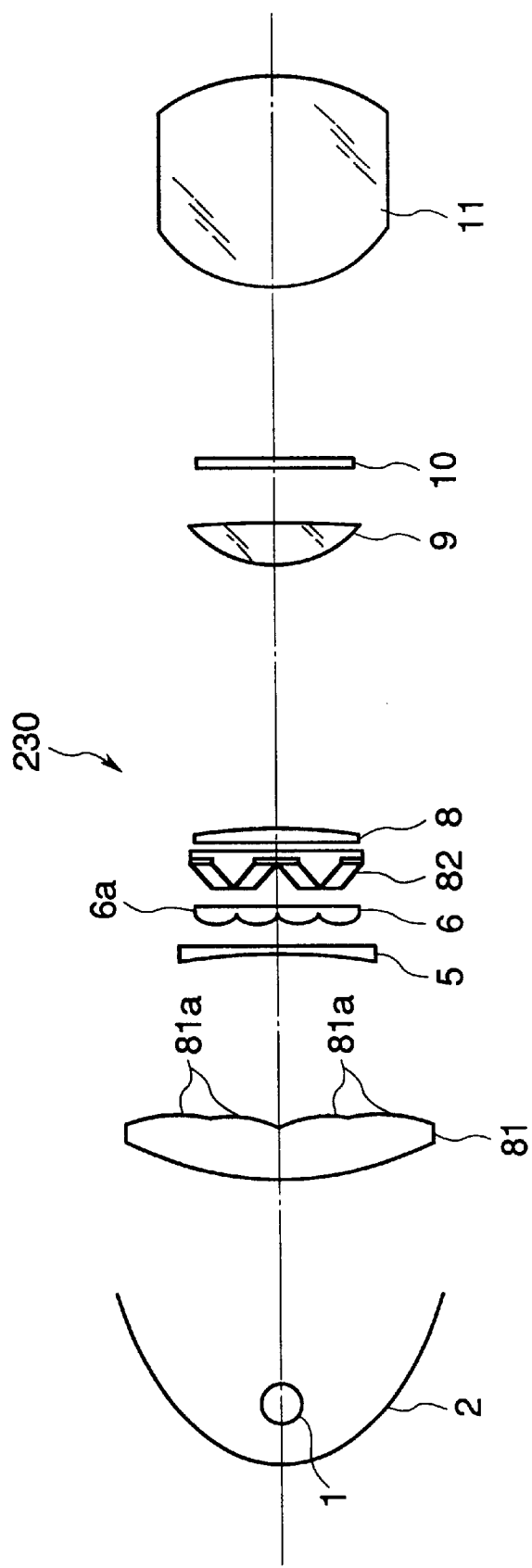
FIG. 18 is a schematic view of the essential portions of Embodiment 4 of the present invention.

FIG. 18 is a schematic view of the essential portions of Embodiment 4 of the present invention. In FIG. 18, the reference numeral 230 designates a part or the entire illuminating apparatus, and the reference numeral 1 denotes a light source such as a metal halide lamp. The reference numeral 2 designates an emission mirror which is a reflector of which the reflecting surface comprises a parabolic surface, and it reflects the light beam from the light source placed at the focus position thereof and converts it into parallel light, and causes the parallel light to enter a first convex lens array 81 through a concave lens 5. The first convex lens array 81 comprises a plate comprising a plurality of lenses 81a arranged side by side and having positive refractive power.

The concave lens 5 has negative refractive power. The reference numeral 6 denotes a second convex lens array. The reference numeral 82 designates a polarization converting element array which comprises a construction shown in FIG. 19 and converts incident non-polarized (random-polarized) light into linearly polarized light polarized in a particular direction and causes it to emerge. The reference numeral 8 denotes a condensing lens. The reference numeral 9 designates a condenser lens which condenses the illuminating light on the entrance pupil (aperture stop) of a projection lens 11.

The reference numeral 10 denotes an image display element comprising a liquid crystal panel. The projection lens 11 has positive refractive power, and enlarges and projects a projected image formed by the image display element 10 onto a screen or a wall.

The construction of the polarization converting element array 82 will now be described with reference to FIG. 19. The polarization converting element array 82 has a plate-like member 82d comprising surfaces having a mountain-like shape and flat surfaces, four bar-like prisms 82b and three half wavelength plates 82c, and is constructed with the members joined together in such a form that a polarization separating surface 82a is provided on a surface of each bar-like prism 82b and the half wavelength plates 82c are provided in the optical path of S-polarized light or P-polarized light separated by the polarization separating surface 82a.

Figure 19:
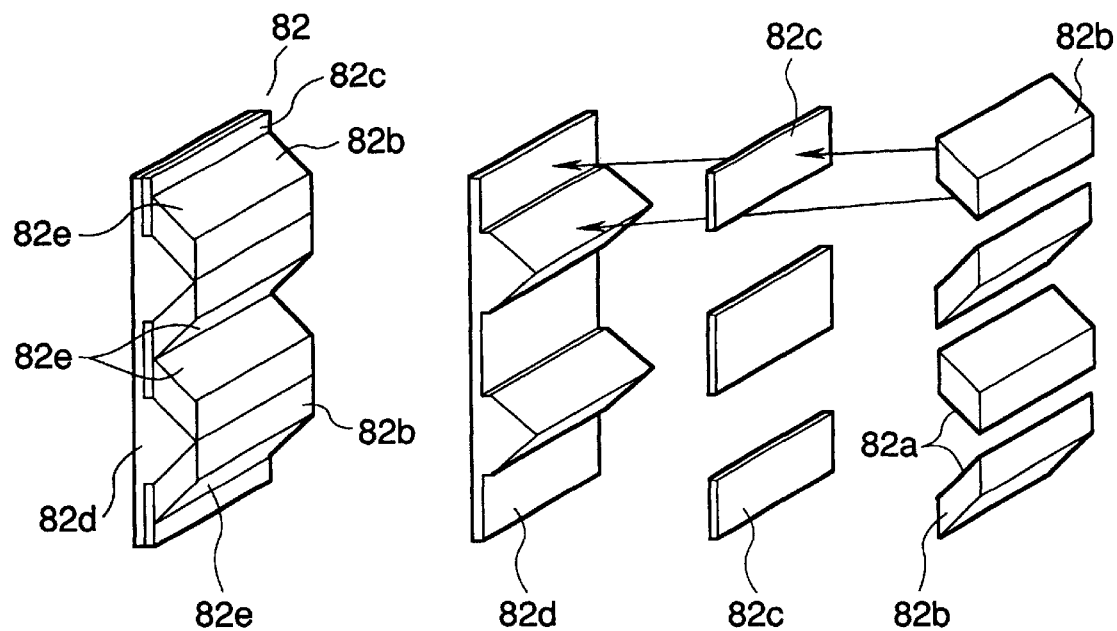
FIG. 19 is an illustration of a portion of FIG. 18.
Figure 20:
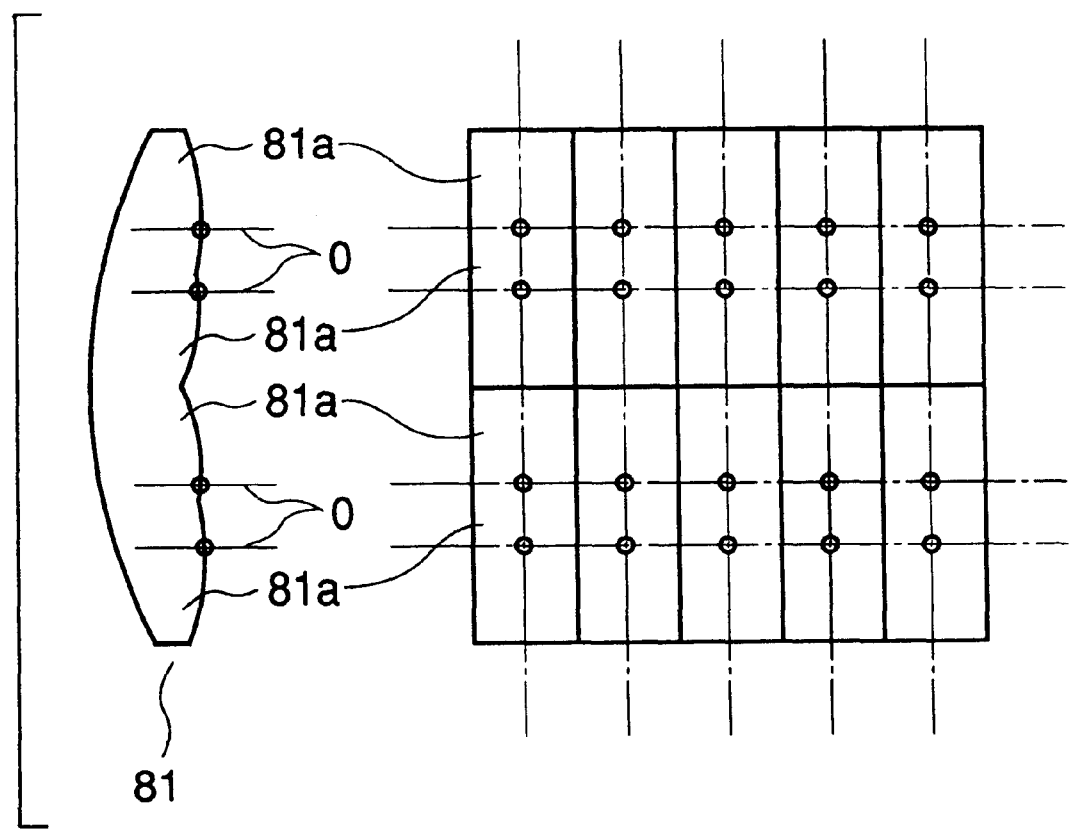
FIG. 20 is an illustration of a portion of FIG. 18.

In FIG. 19, the bar-like prisms and the mountain-shaped plate-like member are joined together with the half wavelength plates 82c interposed therebetween so that the half wavelength plates 82c may receive S-polarized light. With such a construction, the polarization separating surfaces 82a are not formed at equal intervals, but yet as shown in FIG. 20 which shows the lenses of the first convex lens array 81, the optical axes 0 of the lenses 81a are made eccentric relative to the center of each lens 81a, whereby it becomes possible to make the condensing point by each lens 81a of the first convex lens array 81 correspond to the corresponding polarization separating surface 82a as shown in FIG. 21.

Figure 21:
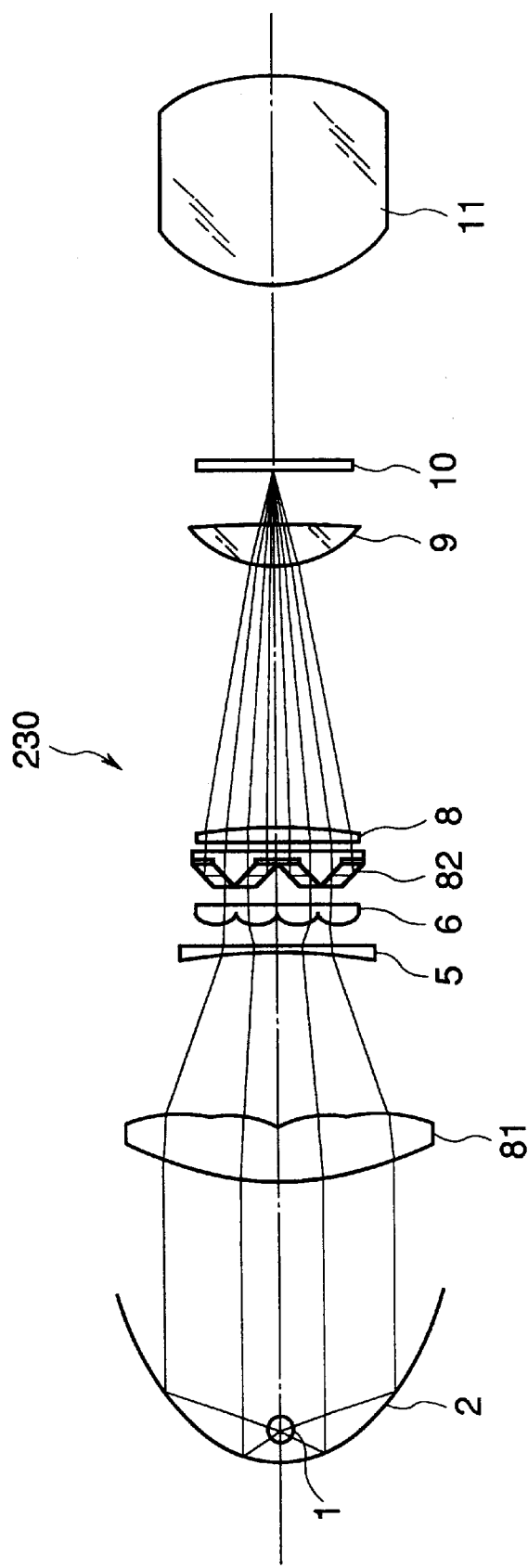
FIG. 21 is an illustration of the optical path of Embodiment 4 of the present invention.

In FIG. 21, the light emitted by the light source 1 is reflected toward the image display element 10 by the parabolic mirror 2 and is converted into parallel light and enters the first convex lens array 81, and is divided into a plurality of light beams by the array 81, and the plurality of light beams form a plurality of condensing points within a range smaller than the outer diameter of the parabolic mirror 2 near the second convex lens array 6. The concave lens 5 converts the plurality of light beams from the first convex lens array into light beams parallel to one another, and directs them to the second convex lens array 6. The light beams transmitted through the second convex lens array 6 enter the polarization converting element array 82.

The light beams which have entered the polarization converting elements of the polarization converting element array 82 are separated into S-polarized light and P-polarized light (↔ and •) of which the directions of polarization are orthogonal to each other by the polarization separating surface 82a, and the S-polarized light reflected by the polarization separating surface 82a is reflected by the reflecting surface 82c and is transmitted through the half wavelength plate 82c, whereby it is converted into linearly polarized light polarized in the same direction as the P-polarized light transmitted through the polarization separating surface 82a, and emerges from the polarization converting element array 82 as a plurality of linearly polarized lights of which the directions of polarization are the same. The plurality of light beams from the polarization converting element array 82 are combined together on the image display element 10 by the condensing lens 8 and the condenser lens 9.

The light beam transmitted through the image display element 10 in directed to the projection lens 11. An image formed on the image display element 10 is projected onto a screen or a wall by the projection lens 11.

Figure 22:
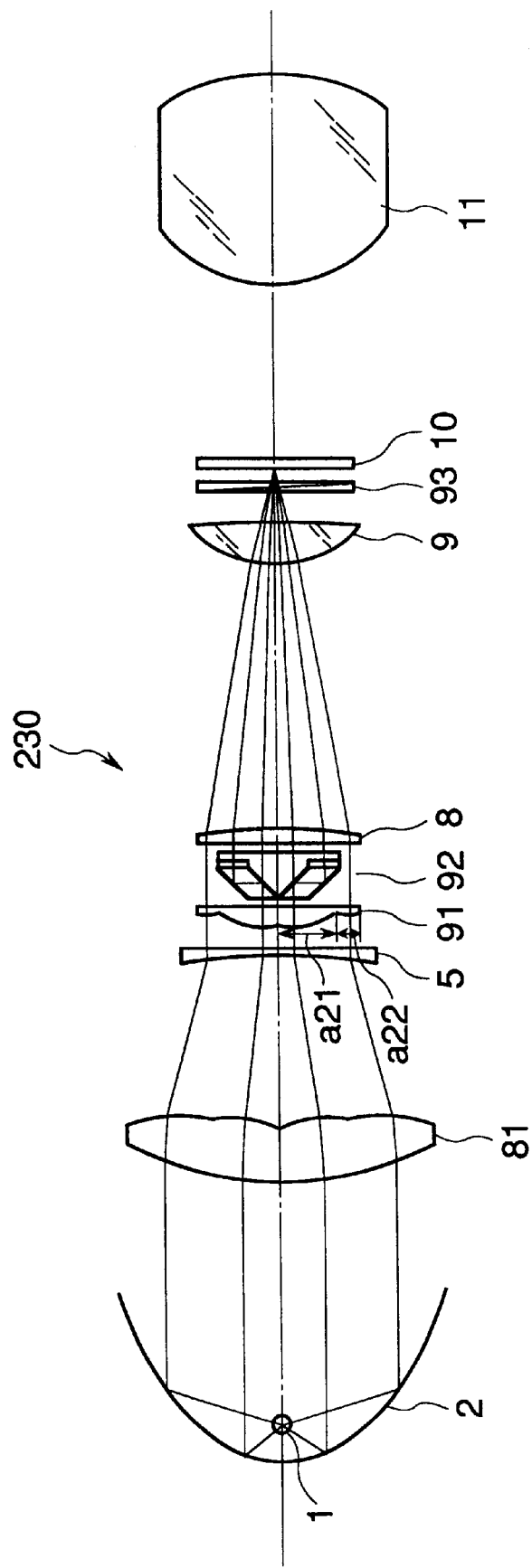
FIG. 22 is a schematic view of the essential portions of Embodiment 5 of the present invention.

FIG. 22 is a schematic view of the essential portions of Embodiment 5 of the present invention. This embodiment differs from Embodiment 4 of FIG. 18 only in the shapes of a second convex lens array 91 and a polarization converting element array 92 and in that a polarizing plate 93 is disposed between the condenser lens 9 and the image display element 10, and in the other points, the construction of this embodiment is the same as that of Embodiment 4. Here, the polarization converting element array 92 is made just half the array 82 in Embodiment 4 with respect to the direction of the array.

The polarization converting element array 92 in the present embodiment does not correspond to all of individual lenses constituting the second convex lens array 91, but effects the polarization conversion of only a light beam passing through the row of lenses in the central portion of the second convex lens array 91. Since the intensity of the parallel light beam from the parabolic mirror 2 concentrates in the central portion, a polarization converting system for converting only the central portion of the parallel light beam into predetermined linearly polarized light is provided so that most of the parallel light of which the polarization is random may be converted into linearly polarized light.

At this time, in the second convex lens array 91, the size a21 of the central lens for receiving the light in the central portion which effects polarization conversion is set larger than the size a22 of the lenses in the peripheral portion, whereby polarization conversion can be affected more efficiently.

Also, in such a construction, the light beam which is not polarization-converted intactly illuminates the liquid crystal panel 10 in a non-polarized state and therefore, a polarizing plate 93 is provided near the panel. If such a construction is adopted, the parts used in the polarized light converting element array 92 can be decreased to e.g. a half and the downsizing of the apparatus becomes easy.

The illuminating apparatuses of the above-described Embodiments 2 to 4 can also be applied to the liquid crystal projector of FIG. 23.

What is claimed is:

1. An illuminating apparatus comprising:
   a converging optical system for converting light from a light source into convergent light;
   a first convex lens array for converting said convergent light into a plurality of light beams;
   a collimating optical system for making the plurality of light beams parallel to one another; and
   a polarization converting element for converting the plurality of light beams from said collimating optical system into polarized light beams.

2. The apparatus of claim 1, wherein between said collimating optical system and said polarization converting element array, there is a second convex lens array of which each convex lens corresponds to each of said plurality of light beams.

3. The apparatus of claim 1, wherein said converging optical system comprises an elliptical mirror, and said light source is at a focus of said elliptical mirror.

4. The apparatus of claim 1, wherein said converging optical system comprises a parabolic mirror, said light source is at a focus of said parabolic mirror, and said converging optical system comprises a convex lens for receiving parallel light from said parabolic mirror.

5. The apparatus of claim 1, wherein said collimating optical system comprises a concave lens.

6. An illuminating apparatus comprising:
   a converging optical system for converting light from a light source into convergent light;
   a first convex lens array for converting the convergent light into a plurality of light beams;
   a collimating optical system for making the plurality of light beams parallel to one another;
   a second convex lens array in which each convex lens corresponds to one of the plurality of light beams from said collimating optical system;
   a polarization converting element array for converting said plurality of light beams from said second convex lens array into polarized light beams;
   an optical system for overlapping said polarized light beams from said polarization converting element array mutually on a surface to be illuminated.

7. The apparatus of claim 1, wherein each element of said polarization converting element array comprises a polarization splitter, an optical path bending mirror and a half wavelength plate.

8. A projector comprising a projecting apparatus for projecting an image formed by an image forming panel and an illuminating apparatus according to claim 1.

9. A projector comprising a projecting apparatus for projecting an image formed by an image forming panel and an illuminating apparatus according to claim 2.

10. A projector comprising a projecting apparatus for projecting an image formed by an image forming panel and an illuminating apparatus according to claim 3.

11. A projector comprising a projecting apparatus for projecting an image formed by an image forming panel and an illuminating apparatus according to claim 4.

12. A projector comprising a projecting apparatus for projecting an image formed by an image forming panel and an illuminating apparatus according to claim 5.

13. A projector comprising a projecting apparatus for projecting an image formed by an image forming panel and an illuminating apparatus according to claim 6.

14. The apparatus of claim 6, wherein said second convex lens array is located between said collimating optical system and said polarization converting element array.

15. The apparatus of claim 6, wherein said converging optical system comprises an elliptical mirror, and said light source is at a focus of said elliptical mirror.

16. The apparatus of claim 6, wherein said converging optical system comprises a parabolic mirror, with said light source at a focus of said parabolic mirror, and said converging optical system comprises a convex lens for receiving parallel light from said parabolic mirror.

17. The apparatus of claim 6, wherein said collimating optical system comprises a concave lens.

18. A projector, comprising:
   an illumination optical system;
   a liquid crystal panel illuminated by said illumination optical system; and
   a projection optical system for projecting image light from said illuminated liquid crystal panel, wherein said illumination optical system comprises:
   a converging optical system for converting light from a light source into convergent light;
   a first convex lens array for converting said convergent light into a plurality of light beams;
   a collimating optical system for making the plurality of light beams from said first convex lens array parallel to one another; and
   a polarization converting element array for converting the plurality of light beams from said collimating optical system into polarized light beams; and
   an optical system for overlapping the polarized light beams from said polarization converting element array mutually on said liquid crystal panel.

19. The projector according to claim 18, wherein between said collimating optical system and said polarization converting element array, there is a second convex lens array of which each convex lens corresponds to each of said plurality of light beams.

20. The projector according to claim 19, wherein said converging optical system comprises an elliptical mirror, and said light source is at a focus of said elliptical mirror.

21. The projector according to claim 19, wherein said converging optical system comprises a parabolic mirror, said light source is at a focus of said parabolic mirror, and said converging optical system comprises a convex lens for receiving parallel light from said parabolic mirror.

22. The projector according to claim 19, wherein said collimating optical system comprises a concave lens.

23. A projector comprising:
   an illumination optical system;
   a liquid crystal panel illuminated by said illuminating apparatus; and
   a projection optical system for protecting image light from said illuminated liquid crystal panel, wherein said illumination optical system comprises:
   a converging optical system for converting light from a light source into convergent light;

a first convex lens array for converting said convergent light into a plurality of light beams;

a collimating optical system for making the plurality of light beams parallel to one another;

a second convex lens array in which each convex lens corresponds to one of the plurality of light beams from said collimating optical system;

a polarization converting element array for converting the plurality of light beams from said second convex lens array into polarized light beams; and an optical system for overlapping the polarized lights beams from said polarization converting element array mutually on said liquid crystal panel.

24. A projector comprising a projecting apparatus for projecting an image formed by an image forming panel and an illuminating apparatus according to claim 7.

25. The projector of claim 23, wherein said second convex lens array is located between said collimating optical system and said polarization converting element array.

26. The projector of claim 23, wherein said converging optical system comprises an elliptical mirror, and said light source is at a focus of said elliptical mirror.

27. The projector of claim 23, wherein said converting optical system comprises a parabolic mirror, said light source is at a focus of said parabolic mirror, and said converting optical system comprises a convex lens for receiving parallel light from said parabolic mirror.

28. The projector of claim 23, wherein said collimating optical system comprises a concave lens.

29. The projector of claim 18, wherein each element of said polarization converting element array comprises a polarization splitter, an optical path bending mirror and a half wavelength plate.

30. The projector of claim 19, wherein each element of said polarization converting element array comprises a polarization splitter, an optical path bending mirror and a half wavelength plate.

31. The projector of claim 20, wherein each element of said polarization converting element array comprises a polarization splitter, an optical path bending mirror and a half wavelength plate.

32. The projector of claim 21, wherein each element of said polarization converting element array comprises a polarization splitter, an optical path bending mirror and a half wavelength plate.

33. The projector of claim 22, wherein each element of said polarization converting element array comprises a polarization splitter, an optical path bending mirror and a half wavelength plate.

34. The projector of claim 23, wherein each element of said polarization converting element array comprises a polarization splitter, an optical path bending mirror and a half wavelength plate.

35. A projector comprising:

an illumination optical system;

an image forming panel illuminated by said illuminating device; and a projection optical system for projecting image light from said illuminated liquid crystal panel, wherein said optical system comprises:

a first optical system for converting light from a light source into convergent light;

first means for converting said convergent light into a plurality of light beams;

a second optical system for making the plurality of light beams from said first means parallel to one another; and second means for converting the plurality of light beams from said second optical system into polarized light beams; and an optical system for overlapping the polarized light beams from said second means mutually on said panel.

36. The projector according to claim 35, wherein between said second optical system and said second means, further comprising a plurality of lenses each in which each lens corresponds to one of the plurality of light beams.

37. The projector according to claim 36, wherein said first optical system comprises an elliptical mirror, and said light source is at a focus of said elliptical mirror.

38. The projector according to claim 36, wherein said first optical system comprises a parabolic mirror, said light source is at a focus of said parabolic mirror, and said first optical system comprises a lens for converging parallel light from said parabolic mirror.

39. The projector according to claim 36, wherein said second optical system comprises a concave lens.

40. An illuminating apparatus, comprising:

a first optical system for converting light from a light source into convergent light;

first means for converting said convergent light into a plurality of light beams;

a second optical system for making said plurality of light beams from said first means parallel to one another; and second means for converting the plurality of light beams from said second optical system into polarized light beams.

41. The apparatus according to claim 40, wherein between said second optical system and said second means, further comprising a plurality of lenses each in which each lens corresponds to one of the plurality of light beams.

42. The apparatus according to claim 40, wherein said first optical system comprises an elliptical mirror, and said light source is at a focus of said elliptical mirror.

43. The apparatus according to claim 40, wherein said first optical system comprises a parabolic mirror, said light source is at a focus position of said parabolic mirror, and said first optical system comprises a lens for converging parallel light from said parabolic mirror.

44. The apparatus according to claim 40, wherein said second optical system comprises a concave lens.

45. The apparatus of claim 1, further comprising an optical system for overlapping the polarized light beams from said polarization converting element array mutually on a surface to be illuminated.

46. The apparatus of claim 2, wherein each element of said polarization converting element array comprises a polarization splitter, an optical path bending mirror and a half wavelength plate.

47. The apparatus of claim 3, wherein each element of said polarization converting element array comprises a polarization splitter, an optical path bending mirror and a half wavelength plate.

48. The apparatus of claim 4, wherein each element of said polarization converting element array comprises a polarization splitter, an optical path bending mirror and a half wavelength plate.

49. The apparatus of claim 5, wherein each element of said polarization converting element array comprises a polarization splitter, an optical path bending mirror and a half wavelength plate.

50. The apparatus of claim 6, wherein each element of said polarization converting element array comprises a polarization splitter, an optical path bending mirror and a half wavelength plate.

51. The apparatus of claim 45, wherein each element of said polarization converting element array comprises a polarization splitter, an optical path bending mirror and a half wavelength plate.

52. The projector of claim 4, wherein said second means comprises a plurality of elements each of which has a polarization splitter, an optical path bending mirror and a half wavelength plate.

53. The apparatus of claim 14, wherein each element of said polarization converting element array comprises a polarization splitter, an optical path bending mirror and a half wavelength plate.

54. The apparatus of claim 15, wherein each element of said polarization converting element array comprises a polarization splitter, an optical path bending mirror and a half wavelength plate.

55. The apparatus of claim 16, wherein each element of said polarization converting element array comprises a polarization splitter, an optical path bending mirror and a half wavelength plate.

56. A projector comprising a projecting apparatus for projecting an image formed by an image forming panel and an illuminating apparatus according to claim 45.

57. A projector comprising a projecting apparatus for projecting an image formed by an image forming panel and an illuminating apparatus according to claim 46.

58. A projector comprising a projecting apparatus for projecting an image formed by an image forming panel and an illuminating apparatus according to claim 47.

59. A projector comprising a projecting apparatus for projecting an image formed by an image forming panel and an illuminating apparatus according to claim 48.

60. The projector of claim 25, wherein each element of said polarization converting element array comprises a polarization splitter, an optical path bending mirror and a half wavelength plate.

61. The projector of claim 26, wherein each element of said polarization converting element array comprises a polarization splitter, an optical path bending mirror and a half wavelength plate.

62. The projector of claim 27, wherein each element of said polarization converting element array comprises a polarization splitter, an optical path bending mirror and a half wavelength plate.

63. The apparatus according to claim 40, further comprising an optical system for overlapping the polarized light beams from said second means mutually on a surface to be illuminated.

64. The projector of claim 35, wherein said second means comprises a plurality of elements each of which has a polarization splitter, an optical path bending mirror and a half wavelength plate.

65. The projector of claim 36, wherein said second means comprises a plurality of elements each of which has a polarization splitter, an optical path bending mirror and a half wavelength plate.

66. The projector of claim 37, wherein said second means comprises a plurality of elements each of which has a polarization splitter, an optical path bending mirror and a half wavelength plate.

67. The projector of claim 38, wherein said second means comprises a plurality of elements each of which has a polarization splitter, an optical path bending mirror and a half wavelength plate.

68. The projector of claim 39, wherein said second means comprises a plurality of elements each of which has a polarization splitter, an optical path bending mirror and a half wavelength plate.

69. The apparatus of claim 40, wherein said second means comprises a plurality of elements each of which has a polarization splitter, an optical path bending mirror and a half wavelength plate.

70. The apparatus of claim 41, wherein said second means comprises a plurality of elements each of which has a polarization splitter, an optical path bending mirror and a half wavelength plate.

71. The apparatus of claim 42, wherein said second means comprises a plurality of elements each of which has a polarization splitter, an optical path bending mirror and a half wavelength plate.

72. The projector of claim 43, wherein said second means comprises a plurality of elements each of which has a polarization splitter, an optical path bending mirror and a half wavelength plate.

73. The projector of claim 63, wherein said second means comprises a plurality of elements each of which has a polarization splitter, an optical path bending mirror and a half wavelength plate.

* * * * *

UNITED STATES PATENT AND TRADEMARK OFFICE
CERTIFICATE OF CORRECTION

PATENT NO. : 6,257,726 B1
DATED : July 10, 2001
INVENTOR(S) : Atsushi Okuyama

It is certified that error appears in the above-identified patent and that said Letters Patent is hereby corrected as shown below:

Column [*] Notice,
Before "subject to any disclaimer, the term of this..." insert the following:

-- This patent issued on a continued prosecution application filed under 37 CFR 1.53(d), and is subject to the twenty year patent term provisions of 35 U.S.C. 154(a)(2). --

Figure 14:
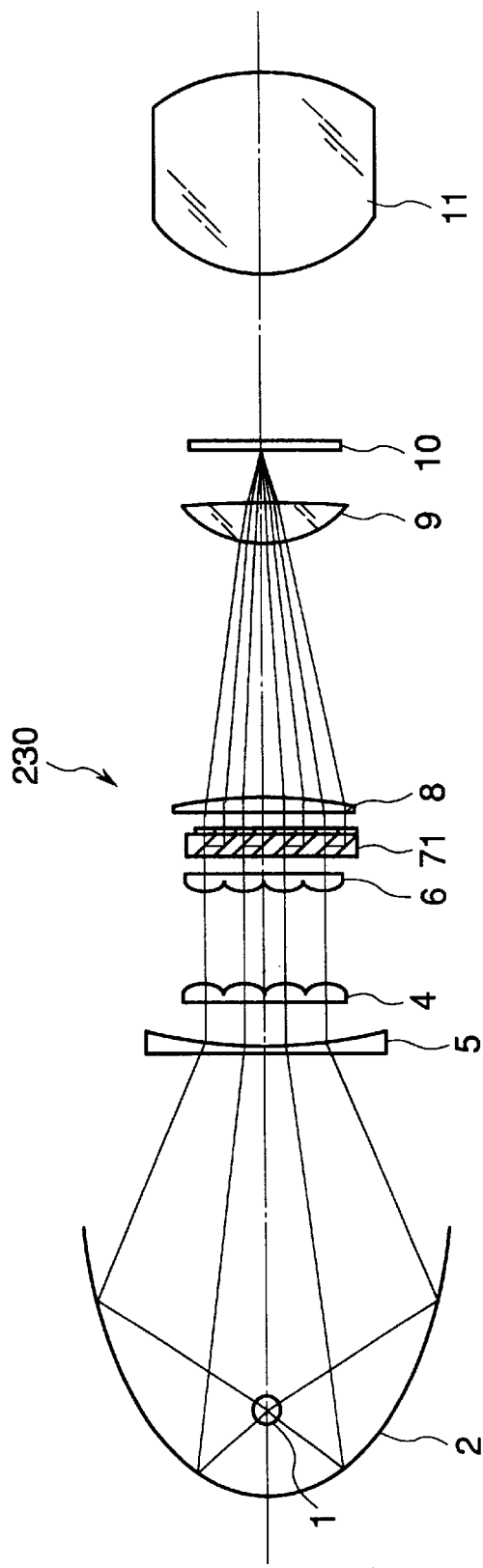
FIG. 14 is an illustration of the optical path of Embodiment 3 of the present invention.

Column 3,
Line 5, "FIG. is 14." should read -- FIG. 14. --.

Column 4,
Line 14, "recordary" should read -- secondary --.

Column 5,
Line 48, "referee" should read -- reference --.

Column 7,
Line 51, "prisms 82b" should read -- prisms (reflecting surfaces) 82b --.

Column 8,
Line 24, "surface 82c" should read -- surface 82b --.

Column 10,
Line 60, ""illuminating" should read -- illumination --.
Line 61, "apparatus; and" should read -- optical system; and --.

Column 11,
Line 11, "lights" should read -- light --.
Line 26, "converting" should read -- converging --.
Line 56, "illuminating" should read -- illumination --.
Line 57, "device; and" should read -- optical system; and --

Column 12,
Line 15, "converging" should read -- receiving --.
Line 40, "converging" should read -- receiving --.

UNITED STATES PATENT AND TRADEMARK OFFICE
CERTIFICATE OF CORRECTION

PATENT NO. : 6,257,726 B1
DATED : July 10, 2001
INVENTOR(S) : Atsushi Okuyama

It is certified that error appears in the above-identified patent and that said Letters Patent is hereby corrected as shown below:

<u>Column 13,</u>
Line 4, "projector of claim 4," should read -- apparatus of claim 44, --.

Signed and Sealed this

Thirtieth Day of April, 2002

*Attest:*

JAMES E. ROGAN
*Attesting Officer*       *Director of the United States Patent and Trademark Office*